US008856572B2

(12) United States Patent
Shimotono (10) Patent No.: US 8,856,572 B2
(45) Date of Patent: Oct. 7, 2014

(54) COMPUTER THAT REDUCES POWER CONSUMPTION WHILE MAINTAINING A SPECIFIC FUNCTION

(75) Inventor: Susumu Shimotono, Hadano (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 586 days.

(21) Appl. No.: 13/012,483

(22) Filed: Jan. 24, 2011

(65) Prior Publication Data

US 2011/0185209 A1    Jul. 28, 2011

(30) Foreign Application Priority Data

Jan. 23, 2010    (JP) .................................. 2010-012644

(51) Int. Cl.
*G06F 1/00*    (2006.01)
*G06F 1/32*    (2006.01)

(52) U.S. Cl.
CPC ............ *G06F 1/3203* (2013.01); *G06F 1/3268* (2013.01); *Y02B 60/1246* (2013.01)
USPC .......................................... 713/324; 713/323

(58) Field of Classification Search
CPC .............................. G06F 1/3203; G06F 1/3287
USPC ................................................ 713/320–324
See application file for complete search history.

(56) References Cited

U.S. PATENT DOCUMENTS

| | | | |
|---|---|---|---|
| 5,163,153 A | 11/1992 | Cole | |
| 5,303,171 A * | 4/1994 | Belt et al. ....................... | 713/321 |
| 5,978,923 A * | 11/1999 | Kou .............................. | 713/323 |
| 6,243,819 B1 * | 6/2001 | Jung ............................. | 713/320 |
| 6,457,134 B1 * | 9/2002 | Lemke et al. ................. | 713/323 |
| 6,617,815 B1 * | 9/2003 | Krief ............................. | 318/471 |
| 7,426,647 B2 * | 9/2008 | Fleck et al. ................... | 713/320 |
| 7,480,813 B2 * | 1/2009 | Asoh et al. ................... | 713/324 |
| 7,500,127 B2 * | 3/2009 | Fleck et al. ................... | 713/324 |
| 7,702,733 B2 * | 4/2010 | Fleck et al. ................... | 709/206 |
| 7,996,480 B2 * | 8/2011 | Fleck et al. ................... | 709/206 |

(Continued)

FOREIGN PATENT DOCUMENTS

| | | |
|---|---|---|
| CN | 1707399 A | 12/2005 |
| CN | 101571879 A | 11/2009 |
| CN | 101595456 A1 | 12/2009 |
| JP | 2005-352897 | 12/2005 |

OTHER PUBLICATIONS

Microchip Technology Inc. Section 10. Power Saving Features. 2006.*

(Continued)

*Primary Examiner* — Matthew D Spittle
(74) *Attorney, Agent, or Firm* — Ference & Associates LLC (57) ABSTRACT

A laptop PC is enabled to operate with small power consumption while maintaining a specific function. A laptop PC is provided with a HDD and can operate in a normal mode and a doze mode as a new operating mode. In the doze mode, the computer can operate with power consumption less than in the normal mode while executing a process to implement a specific function. In the doze mode a shift event is created, and a process existing at that time is force-suspended or an I/O processing completion notification is suspended to a process that makes an I/O request to the HDD. As a result, the laptop PC is enabled to operate with small power consumption by stopping the HDD while maintaining a specific function.

18 Claims, 7 Drawing Sheets

(56) References Cited

U.S. PATENT DOCUMENTS

| | | | |
|---|---|---|---|
| 8,046,617 B2* | 10/2011 | Fleck et al. | 713/324 |
| 8,463,957 B2* | 6/2013 | Stedman et al. | 710/36 |
| 2010/0141399 A1* | 6/2010 | Swope | 340/10.33 |

OTHER PUBLICATIONS

Herrera-Alonso et al. On the Use of the Doze Mode to Reduce Power Consumption in EPON Systems. IEEE. Jan. 15, 2014.*

* cited by examiner

COMPUTER THAT REDUCES POWER CONSUMPTION WHILE MAINTAINING A SPECIFIC FUNCTION

CLAIM FOR PRIORITY

The application claims priority to Japanese Patent Application No. 2010-012644, filed on Jan. 23, 2010, the contents of which are fully incorporated by reference here.

FIELD OF THE EMBODIMENT

The subject matter described herein relates to a technique of reducing power consumption of a computer, and more particularly relates to a technique of reducing power consumption of a computer while maintaining a specific function.

BACKGROUND

The specifications of the Advanced Configuration and Power Interface (ACPI) define six operating states (power states) from S0 state to S5 state. In S0 state, a computer operates, and a processor (CPU) and other devices can automatically transition to a power-saving mode for operation based on the algorithms set thereto in accordance with the access frequency and the load status. S1 state to S4 state are called sleeping states, where the CPU stops execution of instructions.

The ratio of reduction in power consumption increases in the order from S1 to state to S4 state, and a time required for resumption of S0 state from each state increases in this order. S3 state is called suspend or standby where the context of the processor in S0 state is stored in a main memory and electric power to the main memory is secured. S4 state is called hibernation where the context of the processor and the content stored in the main memory are stored in a nonvolatile recording medium. S5 state is a soft-off state where the power consumption is the same as in S4 state.

A notebook personal computer (hereinafter called a laptop PC) may use an operating mode of lid-close-no action. In this operating mode, when a Liquid Crystal Display (LCD) case that holds the LCD is closed, an operation of the LCD only is stopped and a system maintains S0 state. The lid-close-no action is suitable for an operating mode such that a laptop PC is not used for a short time, because the PC can resume S0 state in a short time.

Japanese Patent Application Publication No. 2005-352897 teaches a technique of avoiding malfunction during transfer of a laptop PC. The embodiment of this document defines a transfer mode as a new operating mode so as to ensure safety against dropping of the PC during transfer for a short time such as transfer between an office and a meeting room, while shortening a resumption time. According to this document, when a lid is closed so as to place the laptop PC into the transfer mode, the operation of a CPU is continued, reading/writing requests to a hard disk drive (HDD) are stored in a queue and a head of the HDD is withdrawn from the above of the disk.

Meanwhile, a laptop PC may include an application program (hereinafter called an application) for chatting installed therein enabling real time conversation using a wireless network. Such a chat application is equipped with a function to display a login status of the person on the other end of conversation on a screen, and once a session configured is disconnected during transfer of the laptop PC, his/her log-out state will be shown on a screen on the other end. In this case, although he/she is not able to make a response only for a short time due to transfer, the person on the other end will misjudge due to the disconnection of the session that he/she is not able to respond for a long time, thus impairing prompt information exchange. In order to maintain a session of the chat application even during transfer, electric power has to be supplied to devices such as a CPU, a main memory and a wireless module, and related programs have to be in an executable state.

On the other hand, since a user does not conduct any job with the laptop PC during transfer, power consumption thereof is desirably minimized. From S1 state to S4 state of the ACPI, since a CPU does not execute an instruction, a wireless network cannot be maintained or a session of the chat application cannot be maintained. In S3 state, since it may take a long time to resume, such a state does not offer sufficient convenience as a temporary power-saving mode.

In order to maintain specific functions such as a chat application and a wireless network, an operating system (OS) also has to be kept in an executable state. However, an OS such as WINDOWS® includes a task scheduler incorporated therein to automatically execute an application, so that a large number of processes may be executed at a predetermined reserved time. Thus, while maintaining specific functions, the automatic operation of such processes increases the utilization of a processor or drives a device consuming a lot of power such as a HDD. Therefore sufficient reduction in power consumption cannot be achieved. Further, applications include an antiviral program that issues warning when the execution of corresponding processes is stopped, and therefore it is difficult for another program to forcibly stop such an application. Additionally, since such an antiviral program frequently accesses a HDD, sufficient power-saving cannot be achieved unless the access is stopped.

In the transfer mode of the embodiment in Japanese Patent Application Publication No. 2005-352897, network connection can be maintained even when a laptop PC is not used for a short time due to transfer and a resumption time of a normal mode is shorter than in S3 state. In addition, an access operation to a HDD is suspended, so that power consumption of the HDD can be reduced. However, since programs that do not access the HDD continues to operate as usual, the utilization of the CPU increases with the operation of these programs. The CPU consumes the maximum power among devices of a computer. Therefore, it cannot be said that the transfer mode in Japanese Patent Application Publication No. 2005-352897 is sufficient from the viewpoint of reduction in power consumption of a laptop PC during transfer. Similarly it cannot be said that the operating mode of lid-close-no action is sufficient, because power consumption thereof is large during transfer. Therefore, another operating mode has been demanded, which is capable of maintaining specific functions such as a chat application and a wireless network and being free from an increase in power consumption due to functions that need not be maintained.

SUMMARY OF THE INVENTION

An aspect provides a computer program product comprising: a computer readable storage medium having computer readable program code embodied therewith that shifts a computing device operating in a normal mode to a doze mode without interrupting a specific function, the computer readable program code comprising: computer readable program code configured to detect a shift event that makes the computing device shift from the normal mode to the doze mode; computer readable program code configured to perform one or more of: in response to the shift event, force-suspend a process that is not necessary to implement the specific function, the process being selected from processes existing when the shift event is detected; and in response to the shift event, suspend an I/O processing completion notification with respect to a process that makes an I/O request to a disk drive among processes not subjected to the force-suspending until the doze mode ends Another aspect provides an apparatus comprising: one or more processors; a disk drive; a wireless module; an event detection unit that detects a shift event that shifts the apparatus operating in a normal mode to a doze mode without interrupting a specific function; and one or more of: a force-suspend unit that, in response to the shift event, force-suspends a predetermined process selected from processes existing when the shift event is detected; and a request control unit that, in response to the shift event, suspends an I/O processing completion notification in response to an I/O request that a predetermined process selected from processes existing when the shift event is detected makes to the disk drive until the doze mode ends.

A further aspect provides a method comprising: detecting a shift event that makes a computing device shift from the normal mode to the doze mode; and performing one or more of: in response to the shift event, force-suspending a process that is not necessary to implement a specific function, the process being selected from processes existing when the shift event is detected; and in response to the shift event, suspending an I/O processing completion notification with respect to a process that makes an I/O request to a disk drive among processes not subjected to the force-suspending until the doze mode ends.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

DETAILED DESCRIPTION

It will be readily understood that the components of the embodiments, as generally described and illustrated in the figures herein, may be arranged and designed in a wide variety of different configurations in addition to the described embodiments. Thus, the following more detailed description of the example embodiments, as represented in the figures, is not intended to limit the scope of the claims, but is merely representative of those example embodiments.

Reference throughout this specification to "one embodiment" or "an embodiment" (or the like) means that a particular feature, structure, or characteristic described in connection with the example embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

An embodiment provides a computer operating in a new operating mode bringing harmony to its convenience and power consumption. An embodiment provides a computer operating in an operating mode achieving power-saving while maintaining specific functions involving execution of processes. An embodiment provides a computer operating in an operating mode from which resumption of a normal mode can be completed in a short time. An embodiment provides a computer operating in an operating mode enabling resumption with a high degree of reliability.

An embodiment defines a doze mode that is a new operating mode different from the conventional power-saving mode. In the conventional computers, in an active state allowing a processor to execute instructions, power-saving operations are performed based on algorithms set for individual devices such as by reducing power consumption of a processor in accordance with a load, by reducing a rotational speed of a HDD, or by reducing brightness of a LCD. In the doze mode, a processor is in an active state, and a computer executes a corresponding process to maintain specific functions required by a user, while the respective devices operate or stop with power consumption less than in a normal mode. In the doze mode, an instruction is not executed when the processor is in an idle state. Instead, the processor transitions to a sleeping state with small power consumption and may transition to an active state in a short time when an instruction is to be executed.

In the doze mode, the processor and other devices desirably operate with required minimum power consumption to implement a specific function. To this end, in an embodiment, a process that is not necessary to implement the specific function is force-suspended so as to reduce the utilization of the CPU, thus reducing power consumption. In order to implement the specific function, not only a process of an application directly related to the specific function but also a system process implementing OS functions have to operate. Therefore, system processes created by the OS cannot be stopped without careful consideration. Some of the system processes created by the OS, however, access a disk drive consuming a lot of power. Further, some applications take countermeasures against force-suspending and access the disk drive frequently.

The disk drive may be a HDD, a Solid State Drive (SDD) or a hybrid HDD. In an embodiment, in order to reduce power consumption while maintaining a specific function, an operation of the disk drive is limited while not stopping a system process of the OS that is necessary to implement the specific function, thus further reducing power consumption. To this end, in an embodiment, in response to a shift event for shift to the doze mode, an I/O processing completion notification is suspended to a process that makes an I/O request to the disk drive among processes not subjected to the force-suspending until the doze mode ends. In an embodiment, the suspending of an I/O processing completion notification has the same meaning as suspending an I/O request, both of which keeps the corresponding process in the WAIT state.

An embodiment uses a multi-thread system, where each process is executed with a plurality of threads. A thread making an I/O request to the disk drive transitions to a WAIT state during the doze mode, whereas another thread created from the same process but not making an I/O request is in a scheduling state. The thread in the scheduling state transitions between the READY state and the RUN state. Thus, even when one of the threads of a system process makes an I/O request and transitions to the WAIT state, another thread necessary to implement the specific function can be executed. Further, as for a process of a program taking countermeasures against the force-suspending, such a process is not force-suspended, but an I/O request to the disk drive is just suspended, and therefore the countermeasures by such an application can be intercepted.

As the application creating a process or a thread that implements a specific function, an application that does not make an I/O request to the disk drive at least during the doze mode can be selected. As a result, even when the process or the thread is executed to implement the specific function during the doze mode, the disk drive does not operate. The OS may make the disk drive spin down, or may stop electric power thereto in response to a shift event, thus reducing power consumption.

The process implementing the specific function may include a process that maintains connection between a wireless module and an access point during the doze mode. For wireless communication, an IP address has to be obtained from a DHCP server and an association has to be established with the access point. However, as long as the wireless communication is maintained during the doze mode, access to a wireless network can be instantaneously performed when the normal mode is resumed. Alternatively, a process implementing the specific function may include a process that maintains a session formed by a chat program. As long as a session of the chat program is maintained during the doze mode, user's absence will not be shown to the person on the other end of the conversation in the case of shifting to the doze mode for a short time, and therefore prompt information exchange is not affected.

Resumption of the normal mode from the doze mode cannot be conducted by a method as in the resumption from suspend or hibernation where electric power supplied to the processor triggers starting of an instruction execution from a predetermined address. Thus, the resumption has to be processed by a process in the scheduling state. In an embodiment, a process necessary to the resume processing is configured with a process or a thread that does not make an I/O request, whereby a return event can be detected by software for resumption.

In the doze mode, since the processor is in an active state, power consumption is larger than in suspend. Thus, it is desirable that, when a battery becomes exhausted during the doze mode, shifting to suspend or hibernation is automatically conducted. In an embodiment, a process to transition from the doze mode to suspend or hibernation is included in a process that does not make an I/O request, thus enabling shift to suspend or hibernation.

It can be guaranteed or verified that a process implementing a specific function does not access the disk drive during the doze mode. However, when a virtual memory method is used, execution of another process may cause a page to be swapped out from a physical memory to the disk drive. Since swapping-out involves an I/O request made to the disk drive, in an embodiment, it is preferable that a program implementing the specific function regularly refers to a page allocated to the program in a virtual memory so that the order of swapping-out is always made later than a page of another program, thus substantially preventing the page being swapped out.

A force-suspended process may include a process having a same privilege level as a processor privilege level of a user who logs in, in the normal mode. The process having a same privilege level as a process implementing the specific function is not required to implement the specific function unlike a system process, and therefore such a process can be force-suspended without any problem. Further, the force-suspended process may include a process created by a task scheduler registering an execution time of a predetermined program. This is because it can be anticipated that the program registered in the task scheduler also is not required to implement the specific function.

When shifting from the doze mode to suspend or hibernation, an inquiry has to be made to the device drivers as to whether the OS can be shifted or not. Thus, before shift from the doze mode to suspend or hibernation, resumption is conducted so that a process shifted to the force-suspend can be executed in response to a suspend event, and suspension of an I/O request is cancelled so that the computer resumes the normal mode. The shift event may be created when the lid of the computer case is closed, which brings convenience when the computer is shifted to the doze mode for carrying.

An embodiment can provide a computer operating in a new operating mode bringing harmony to its convenience and power consumption. Further, an embodiment can provide a computer operating in an operating mode achieving power-saving while maintaining specific functions involving execution of processes. Still further, an embodiment can provide a computer operating in an operating mode from which resumption of a normal mode can be completed in a short time. Moreover, an embodiment can provide a computer operating in an operating mode enabling resumption with a high degree of reliability.

Example Hardware Configuration

Figure 1:
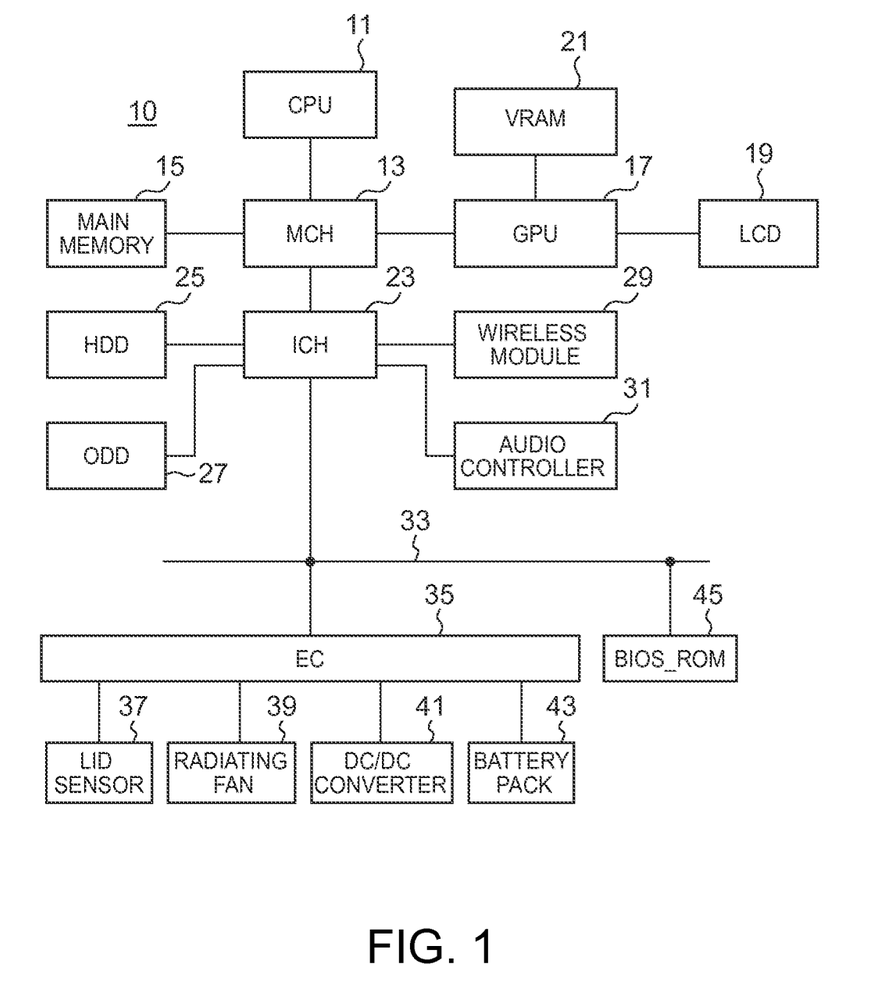
FIG. 1 is a functional block diagram illustrating a major hardware configuration of a laptop PC according to an embodiment.

FIG. 1 is a functional block diagram illustrating a major hardware configuration of a laptop PC 10 according to an embodiment. The same reference numerals are assigned to the same elements over the specification. The laptop PC 10 includes: a system case on a surface of which a keyboard is mounted and inside which electronic devices are contained; and a LCD case containing a LCD 19, where a plurality of electronic devices are incorporated in the system case. The laptop PC 10 is compliant with the specifications by the ACPI. A CPU 11 is a processor playing a central function of the laptop PC 10, executing an OS, a BIOS, a device driver, an application and the like. The CPU 11 consumes power the most among the electronic devices of the laptop PC 10.

In an active state, the CPU 11 uses a technique named SPEEDSTEP® of Intel Corporation, for example, which enables reduction of a set of an operating frequency and an operating voltage to a predetermined value in accordance with the utilization. When the CPU 11 is in an idle state or when the utilization thereof is a predetermined value or less, the CPU 11 can operate in a sleeping state where power consumption is reduced sequentially by stopping a core clock, by flushing the content of a cache into a main memory or a dedicated memory, and transition to an active state can be performed in a short time when an instruction is to be executed. The OS monitors the operating state (the utilization and its transition state) of the CPU 11 so as to control a clock and an operating voltage, thus reducing power consumption of the CPU 11.

The CPU 11 is provided with privilege levels from ring 0 state called a kernel mode to ring 3 state called a user mode. In ring 0 state, the CPU 11 can execute OS codes, and in ring 3 state, the CPU 11 can execute application codes. A memory controller hub (MCH) 13 is a chipset including a memory controller function to control an access operation to a main memory 15 and a data buffer function to smooth out a difference in data transfer rate between the CPU 11 and other devices.

The MCH 13 is connected with the CPU 11, the main memory 15, a graphics processing unit (GPU) 17 and an I/O controller hub (ICH) 23. The main memory 15 is a volatile RAM used as an area for reading a program executed by the CPU 11 and as a working area for writing process data. The GPU 17 is connected with a video memory (VRAM) 21 and the LCD 19. The GPU 17 is a dedicated processor that writes image on the VRAM 21 in accordance with a plotting instruction received from the CPU 11 and sends data of the image to the LCD 19 at a predetermined timing, and the GPU 17 is called a graphics accelerator as well. The ICH 23 processes data transfer concerning peripheral input/output devices.

The ICH 23 is provided with ports such as a Universal Serial Bus (USB), a serial AT Attachment (ATA), a Serial Peripheral Interface (SPI) bus, a Peripheral Component Interconnect (PCI) bus, a PCI-Express bus and a Low Pin Count (LPC), to which a HDD 25, an optical disk drive (ODD) 27, a wireless module 29, an audio controller 31 and a LPC bus 33 are connected, for example. The HDD 25 stores the application, the OS and the device driver executed by the CPU 11 and a doze mode control program (see FIG. 2) according to an embodiment, for example.

The ODD 27 is a device that performs reading/writing with respect to optical disks such as a DVD and a CD. The wireless module 29 performs signal processing for wireless communication by connecting the laptop PC 10 with a wireless LAN or a wireless WAN. The audio controller 31 processes audio signal with respect to a microphone and a speaker (both not illustrated). The LPC bus 33 is connected with devices not requiring high-speed data transfer such as an embedded controller (EC) 35 and a BIOS_ROM 45.

The BIOS_ROM 45 is a nonvolatile memory whose memory content can be electrically rewritten, and the BIOS_ROM 45 stores: a device driver to control input/output devices; a system BIOS compliant with the specifications of the ACPI and that manages the temperature of a power supply and the temperature inside the system case; a Power-On Self Test (POST) code that performs test and initialization of hardware at the start-up of the laptop PC 10; an authentication code for password authentication and the like.

The EC 35 is a microprocessor that manages a power supply and the temperature of the laptop PC 10, and further has a keyboard controller function. The EC 35 is connected with a lid sensor 37, a radiating fan 39, a DC/DC converter 41 and a battery pack 43. The lid sensor 37 creates a shift event for shift to a doze mode when the LCD case is closed on the system case, and when the LCD case is opened, the lid sensor 37 creates a return event for resuming of a normal mode from the doze mode. The rotation speed of the radiating fan 39 is controlled by a plurality of temperature sensors (not illustrated) provided in the system case so as to release air inside the case to the outside to keep the temperatures detected by the temperature sensors within predetermined values.

The DC/DC converter 41 supplies electric power to devices in a defined range in accordance with an operating mode based on an instruction from the EC 35. The DC/DC converter 41 reduces voltage supplied to the CPU 11 when the OS reduces an operating frequency of the CPU 11 or when the CPU 11 transitions to a sleeping state. The battery pack 43 is compliant with the Smart Battery Specification (SBS), and supplies electric power to the laptop PC 10 when the laptop PC 10 is not connected to an AC adaptor (not illustrated). The EC 35 communicates with the battery pack 43 so as to obtain information on the remaining battery capacity and voltage of the battery from the battery pack.

Example Software Configuration

Figure 2:
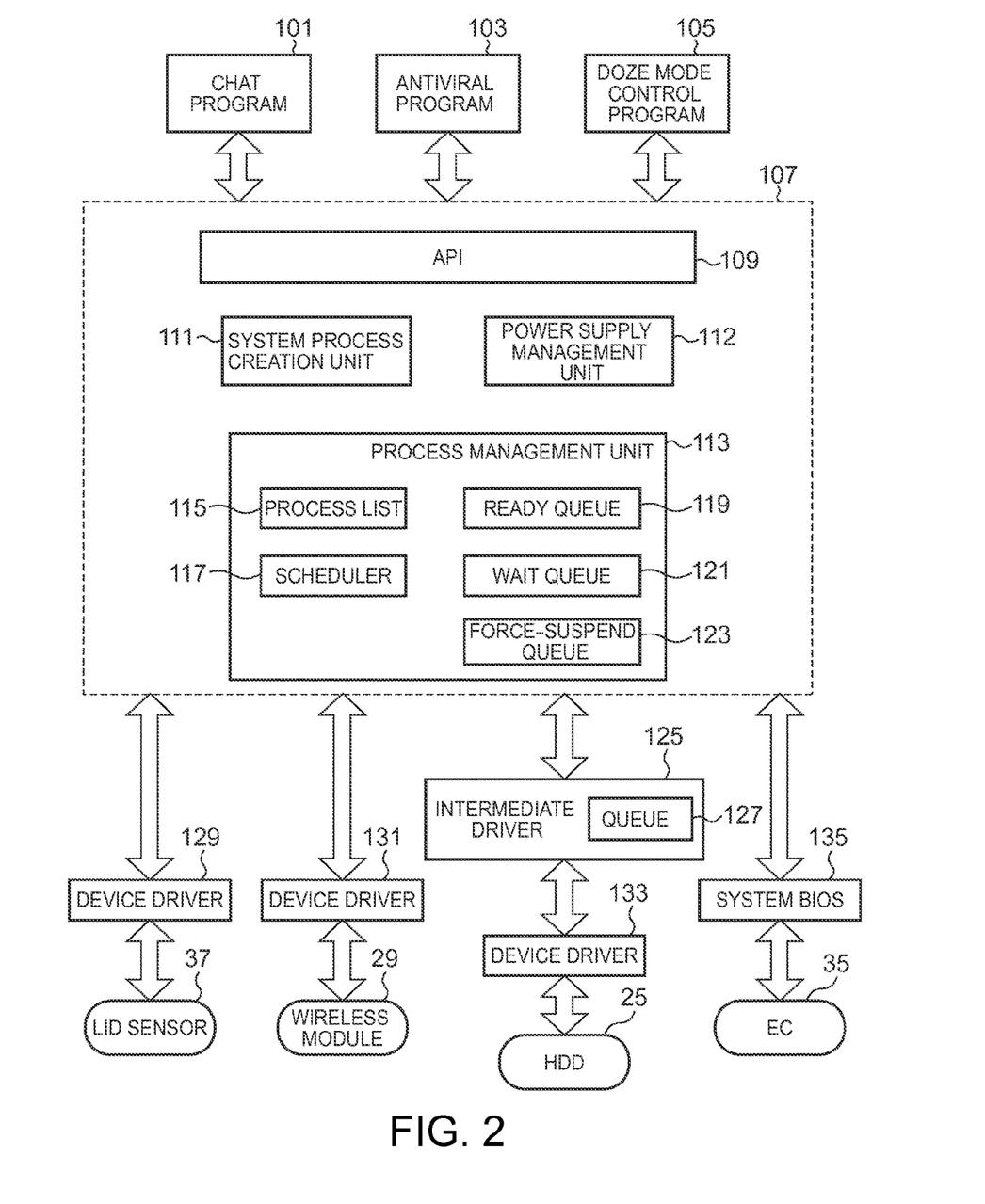
FIG. 2 is a block diagram describing a software configuration of a laptop PC according to an embodiment.

FIG. 2 is a block diagram describing a major software configuration of the laptop PC 10 according to an embodiment. A chat program 101 is a tool enabling a plurality of users to perform real-time communication, for instance, SAMETIME® of Lotus Development Corporation can be used for this purpose. While the chat program 101 operates, the laptop PC 10 has to connect with a network via the wireless module 29. The chat program 101 allows a user initiating a session to show his/her log-on status to other users, so that other users can see the log-on status and perform quick communication.

When the execution of the chat program 101 is stopped or when the wireless connection is stopped, the session configured by the chat program 101 with another user is disconnected and a log-off status is shown, and therefore another user may misjudge that the user becomes unable to use the laptop PC 10 for a long time and may abandon contact at that time. It has been verified that the chat program 101 does not access the HDD 25 after the chat program 101 is loaded to the main memory 15 and while the chat program 101 executes a function of simply maintaining a session configured with another user through a wireless network.

An antiviral program 103 is a program that detects and gets rid of a malicious program breaking into the laptop PC 10. When another process tries to force-suspend a process of the antiviral program 103, the antiviral program 103 determines that the other process is an attack by a malicious program, and takes various countermeasures such as issuing warning, blocking transition to the force-suspend, or stopping the operation of the computer. In an embodiment, even when another process cannot force-suspend a process of the antiviral program 103, the doze mode can be implemented as described later.

A doze mode control program 105 is a program to implement the doze mode according to an embodiment. The doze mode control program 105 detects a shift event to the doze mode, controls a process in the doze mode, detects a return event to a normal mode and performs a return operation to a normal mode. The doze mode control program 105 further displays, on the LCD 19, a screen allowing a user to select an application to implement a specific function to be executed in the doze mode.

The OS 107 includes an API 109, a system process creation unit 111, a power supply management unit 112 and a process management unit 113. The OS 107 uses virtual storage and a paging system for memory management. In order to allocate a new page to a newly created process when available space in the main memory 15 as a physical memory is running low, Least Recently Used (LRU) is used as a replacement algorithm to swap-out another page to the HDD 25. According to LRU, when a page has to be replaced, a page recently used is left in the physical memory and a page not recently used is swapped out to the HDD 25. The OS 107 reduces power consumption by making the CPU 11 transition to a sleeping state in accordance with the load state.

Applications such as the chat program 101, the antiviral program 103 and the doze mode control program 105 need to call a function of the API 109 to use functions of the OS 107 for execution. The system process creation unit 111 creates a system process to execute various programs configuring the OS 107. The system process includes a session manager, Winlogon, a service controller manager and the like, and operates in the background mainly to support other programs. The power supply management unit 112 monitors the utilization of the processor, the execution state of an instruction, an event relating to the power supply and the like, and make a notification to the device drivers and other modules to control a device.

Figure 5:
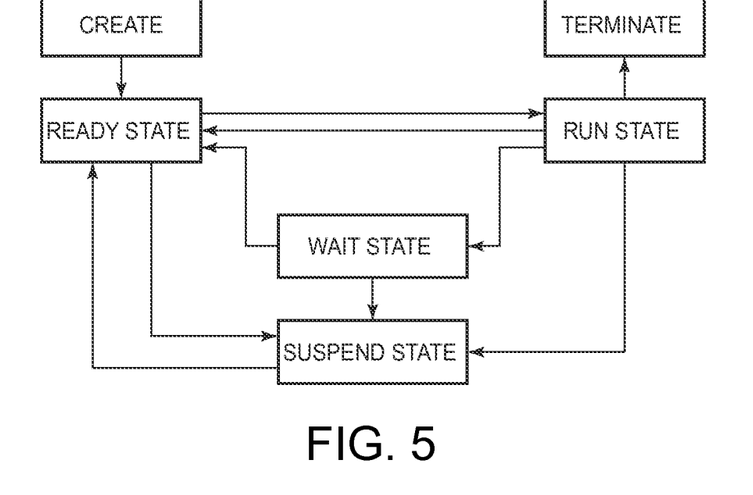
FIG. 5 describes a state where a process management unit controls a process until a thread created in a laptop PC is terminated.

The process management unit 113 includes a process list 115, a scheduler 117, a ready queue 119, a wait queue 121 and a force-suspend queue 123, and manages processes and threads created by applications and the system process creation unit 111. The process list 115 registers all processes currently created in the laptop PC 10. The scheduler 117 performs preemptive task-switching with respect to the created threads based on a predetermined algorithm as illustrated in FIG. 5.

The ready queue 119, the wait queue 121 and the force-suspend queue 123 are described later with reference to FIG. 5. A device driver 129 conveys a shift event and a return event created by the lid sensor 37 to the OS 107. A device driver 131 controls the operation of the wireless module 29 and processes data transfer that the laptop PC 10 conducts with an external computer via a wireless network. A device driver 133 controls the operation of the HDD 25 and processes data transfer conducted between the HDD 25 and the CPU 11 or the main memory 15. An intermediate driver 125 is arranged between the device driver 133 and the OS 107, and includes a queue 127.

After receiving a notification from the doze mode control program 105 via the OS 107 that a shift event shifting to the doze mode is detected, the intermediate driver 125 registers all I/O request packets that the process has performed with respect to the HDD 25 in the queue 127 so as not to transfer the I/O request packets to the device driver 133. When receiving a notification from the doze mode control program 105 via the OS 107 that a return event making the laptop PC 10 resume a normal mode is detected, the intermediate driver 125 transfers the I/O request packets registered in the queue 127 to the device driver 133 sequentially in a FIFO manner and releases the same. A system BIOS 135 notifies the OS 107 of an event created by the EC 35. Functional blocks of software illustrated in FIG. 2 can be considered as hardware elements making the computer function as such when the software is loaded to the main memory 15 and executed by the CPU 11.

Example State Transition of Operating Modes

Figure 3:
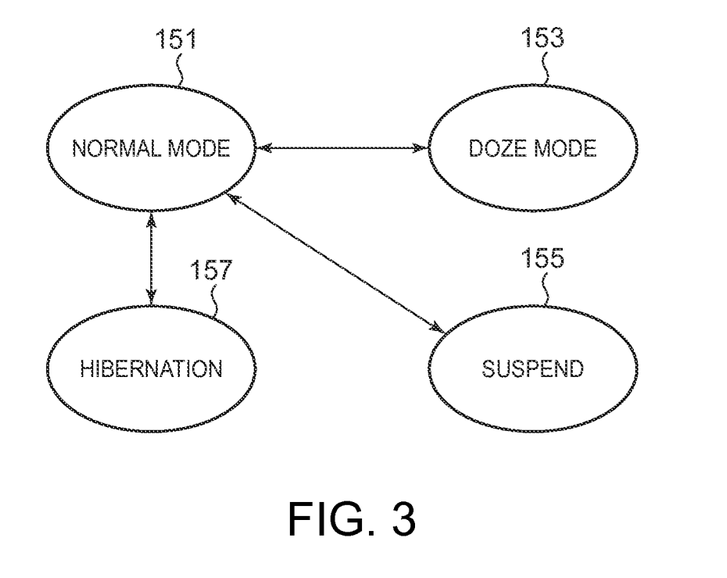
FIG. 3 describes transition of operating modes of a laptop PC.

FIG. 3 describes transition of operating modes of the laptop PC 10. The laptop PC 10 operates in any of four power supply states including a normal mode 151, a doze mode 153, suspend 155 and hibernation 157. The doze mode 153 is a new operating mode defined by an embodiment, but other three operating modes are known. In the normal mode 151 and the doze mode 153, the processor is in an active state or in a sleeping state, so that a process can be executed. However, in suspend 155 and hibernation 157, electric power to the CPU 11 is stopped, so that a process cannot be executed. In a sleeping state, the CPU 11 transitions to any one of C1 through C6 states specified by the ACPI, and transitions to C0 state in a short time as needed to execute a process.

In suspend 155, the context of the CPU 11 is stored in the main memory, and electric power is supplied only to devices necessary to maintain the memory content of the main memory 15, devices necessary to manage the charging state of the battery pack 43 and devices necessary to resume the normal mode 151. In the hibernation 157, the context of the CPU 11 and images developed in the main memory 15 are stored in the HDD 25, and electric power is supplied only to devices necessary to manage the charging state of the battery pack 43 and devices necessary to resume the normal mode 151. The laptop PC 10 can transition mutually between the normal mode 151 and the remaining three operating modes. However, the laptop PC 10 cannot transition directly between the remaining three operating modes mutually, and has to transition always via the normal mode 151.

Examples of Doze Mode and Normal Mode

Figure 4:
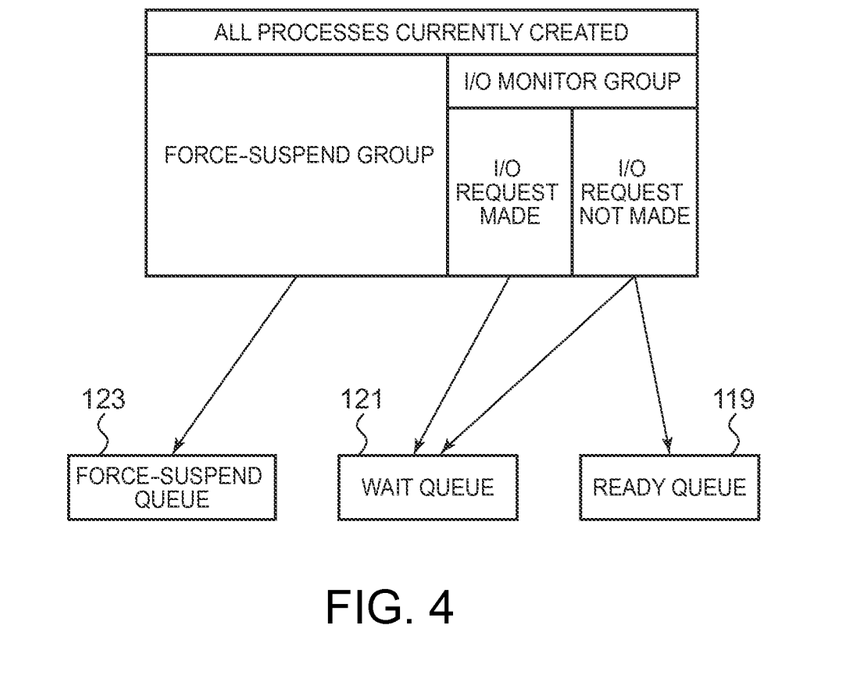
FIG. 4 describes a process control method in the doze mode.

The following describes a doze mode. FIG. 4 describes a process control method in the doze mode. The laptop PC 10 transitions from the normal mode to the doze mode in response to a shift event, and resumes the normal mode from the doze mode in response to a return event. The shift event can be created when the LCD case is closed, and the return event can be created when the LCD case is opened. Alternatively, these events can be created by pressing a Fn button.

The doze mode is a new operating mode for bringing harmony to convenience when the laptop PC 10 cannot be used only for a short time and suppression of the battery consumed. This operating mode is especially convenient for the case where a user moves while carrying the laptop PC 10 between the office and a meeting room in a building equipped with a wireless LAN. Further, the doze mode achieves power saving by maintaining limited functions and stopping other functions, while implementing transition to a normal mode in the minimum time. Moreover, the doze mode is an operating mode where a specific process is executed while limiting accesses to a disk drive.

In the doze mode, only "a specific function" that a user wants in the doze mode and "a basic function" requested by the system are maintained, and other functions are stopped, to the extent possible, for power saving. Herein, the specific function is a function that a user wants to maintain in the doze mode, which is implemented by an application process and a specific process of the OS that is necessary to execute the application process. The specific function includes a function implemented by a process that the doze mode control program 105 creates as well. As the specific function, for example, a function to maintain a session configured by the chat program 101 through a network in the normal mode is included. In this case, the specific function further includes a function to maintain network connection that is necessary to maintain the session of the chat program 101.

In a most common and typical network environment, once connection with a wireless network is disconnected, the laptop PC 10 has to access a DHCP server and acquire a new IP address to access the network again. Then, the laptop PC 10 has to use the thus acquired IP address for association with an access point and establish network connection, and therefore a returning process takes time. In the doze mode, however, as long as connection with a wireless network is maintained, shifting from the doze mode to the normal mode can lead to instantaneous access to a network.

Further, as long as a wireless network is maintained, the laptop PC 10 can make a response when a ping command is sent to confirm a communication path at the TCP/IP level, and therefore the specific function may include only a function to maintain the wireless network. The basic function is to perform a basic operation of the laptop PC 10, including a function to monitor a charging state of batteries in the battery pack 43, a function to shift to suspend or hibernation when the voltage of batteries decreases so as to prevent loss of data developed in the main memory 15, and a function to manage the temperature inside the case, for example.

In an embodiment, in order to control processes created in the normal mode so as to be adapted to the doze mode, all the processes existing before the shift to the doze mode are classified into a force-suspend group and an I/O monitor group. The processes of the force-suspend group are desirably stopped to reduce power consumption because these processes have nothing to do with a specific function to be maintained in the doze mode or are not necessary to implement the specific function. The processes of the force-suspend group are forcibly made to transition to a force-suspend state in the doze mode and are registered in the force-suspend queue 123.

The processes of the force-suspend group include a user process having the same privilege level as a CPU authority level of a user who logs in before the shift to the doze mode. Herein, the user in this case logs in with the user authority and not with the administrator authority. This user process includes processes relating to most applications. The processes of the force-suspend group further include a system process having an authority level higher than the CPU authority level of the user logging in but that is evidently unnecessary to execute a process to implement the specific function and the basic function such as a task scheduler.

In the normal mode, the task scheduler executes an application regularly at a registered time. In the doze mode, however, the task scheduler is included in the force-suspend group, and therefore the application registered is not executed even at the registered time. The system processes to be classified into the force-suspend group are extracted beforehand for each OS, and are registered in the list of the doze mode control program 105.

The processes of the I/O monitor group include a process relating to the specific function and the basic function, a process that has evidently nothing to do with the specific function and the basic function but cannot be stopped, and a process that has difficulty in determination whether or not the process is necessary to implement the specific function and the basic function. When a process of the I/O monitor group makes an I/O request to the HDD 25 for reading/writing, an I/O processing completion notification thereto is suspended, and therefore such a process is registered in the wait queue 121 during the doze mode. Unless an I/O request is made to the HDD 25, the processes of the I/O monitor group are registered in the ready queue 119 for scheduling, or the processes of the I/O monitor group are registered in the wait queue 121 until the condition is satisfied.

As a precondition, the processes implementing the specific function and the processes or the threads implementing the basic function among the processes of the I/O monitor group do not make an I/O request to the HDD 25 at least during the doze mode. In other words, in an embodiment, the specific function is implemented by an application that does not involve access to the HDD 25 consuming a lot of power. The process that has evidently nothing to do with the specific function and the basic function but cannot be stopped includes the antiviral program 103.

The process that has difficulty in determination whether or not the process is necessary to implement the specific function and the basic function includes most system processes implementing functions of the OS 107. Since an application process is executed by receiving assistance from a system process, many system processes cannot be stopped. However, all of such system processes are not necessary to implement the specific function and the basic function, and it is not desirable to increase power consumption due to such unnecessary system processes. In an embodiment, in order to cope with this trade-off problem, system processes are classified into the I/O monitor group, and when a thread makes an I/O request to the HDD 25 consuming a lot of power, the thread is controlled to stop the execution.

Herein, a system process relating to the implementation of the specific function and the basic function may make an I/O request to the HDD 25 and transition to the READY state. In an embodiment, since the process management unit 113 conducts multi-thread processing, one process is executed in the units of a plurality of threads. Then, among the plurality of threads, only the thread making the I/O request to the HDD 25 transitions to the READY state and other threads are executed, so that the specific function and the basic function can be implemented without any problem.

Some of the accesses that a process performs with respect to the HDD 25 in the doze mode can be delayed until the normal mode is resumed. For instance, the OS 107 may write an error log on the HDD 25 when an error occurs in a system operation, and such an error log may be dumped after resumption of the normal mode without any problem. Thus, in the system process, the execution of all threads involving an access to the HDD 25 in the doze mode is suspended after shift to the normal mode. Such monitoring and suspending of an I/O request of a system process prevents the situation where a system thread necessary to implement the specific function and the basic function is force-suspended by mistake, or where a specific system thread accesses the HDD 25, thus causing an increase in power consumption.

Monitoring of an I/O request from a system process without force-suspending the same further enables to implement a resume function by software. In the doze mode, the CPU 11 is in an active state, and therefore resumption cannot be conducted by a method as in resuming from suspend or hibernation where pressing of a Fn key triggers the power supply turned ON and a clock supplied and then a processor executes an instruction from a predetermined address. Further, in order to carry out resumption processing, not only the doze mode control program 105 but also many processes of the OS 107 have to be used. In this respect also, since execution is stopped only for a thread making an I/O request among important system codes, the operation of the lid sensor 37 can be detected and the resumption processing can be conducted.

Since the antiviral program 103 makes an I/O request to the HDD 25 frequently, such an I/O request is suspended and a thread thereof is registered in the wait queue 121. At this time, the antiviral program 103 recognizes that a response from the HDD 25 is just delayed and does not recognize it as an attack by a malicious program, and therefore the antiviral program 103 does not take countermeasures unlike the situation where the thread is force-suspended in response to the I/O request.

In the doze mode, most of the user process is in a force-suspend state, and therefore a lot of system processes do not have a processing request and transition to a WAIT state, and further the antiviral program 103 making an I/O request to the HDD 25 or a thread of the system process also transition to a WAIT state, so that the utilization of the CPU 11 is reduced. The power supply management unit 112 monitors the utilization and can reduce power consumption by reducing a set of an operating frequency and an operating voltage of the CPU 11 or by stopping a clock for operation in a power-saving mode. Since all of the I/O requests to the HDD 25 are registered in the queue 127, the power supply management unit 112 can spin down or stop the HDD 25 in response to a shift event.

In the doze mode, electric power supply range to the devices also is controlled together with the process control. In the doze mode, the hardware state is such that electric power is supplied to the CPU 11, the main memory 15, the lid sensor 37, the DC/DC converter 41, the EC 35 and the wireless module 29 that are devices relating to maintaining of the specific function and the basic function, but electric power supplied to the other devices is stopped. Devices that can be stopped include the HDD 25, the ODD 27, the audio controller 31 and the LCD 19, for example.

In the doze mode, since the amount of heat generated inside the system case is extremely reduced, the radiating fan 39 also can be stopped. When the laptop PC 10 shifts to the doze mode, the radiating fan 39 can decrease the rotation speed gradually with decrease in the temperature inside the system case, and then stops. However, the radiating fan 39 once starting operation does not stop because of a hysteresis operation until the temperature decreases more. However, since it is understood that in the doze mode the power consumption decreases to a degree not requiring the operation of the radiating fan 39, the radiating fan 39 in an embodiment is stopped when the operating mode shifts to the doze mode. Therefore, a user can put the laptop PC 10 shifting to the doze mode in their bag and carry the bag as in the case of suspend.

In the doze mode, devices consuming a lot of power such as the LCD 19, the HDD 25 and the radiating fan 39 are stopped, and the CPU 11 also operates with low power consumption, and therefore the power consumption of the laptop PC 10 as a whole can be substantially the same as in S1 state or S2 state. When resuming the normal mode from the doze mode, the force-suspended processes are resumed in response to a return event, and the I/O request packets to the HDD 25 that are suspended in the queue 127 are fetched from the queue 127 and are simply passed to the device driver 133 of the HDD 25, and therefore a time required to complete the resumption can be shortened, thus increasing convenience.

Example State Transition of Process

FIG. 5 describes a state where the process management unit 113 controls a process until a thread created in the laptop PC 10 is terminated. The OS 107 uses a multi-thread system so that one process is executed in the execution units of a plurality of threads. The chat application 101, the antiviral program 103 and the doze mode control program 105 call an API function and create a process and a thread for execution.

The system process creation unit 111 also creates processes to implement a function of the OS 107. These created processes are controlled by the process management unit 113. The processes are managed as data that is a data structure including a processor state named process control block (PCB), process priority, time slice information, a process ID, device information and the like. The processor state is information concerning statuses of a register, a stack, a program counter and the like when the CPU 11 suspends a process, which is called context as well.

The process priority is information indicating priority sequence of a context switch among processes. The time slice information is information concerning an initial value and a remaining time of the time slice. The time slice refers to the maximum execution time permitted when a process acquires execution right once for the CPU 11. The process ID is a unique number assigned to each process. The device information is identification information of a device assigned to each process. The PCB contains other various types of information that is different from one OS to another.

The created thread firstly transitions to the READY state. In the READY state, an execution condition for the thread is satisfied and the thread waits for execution by the task scheduler 117. When the PCB is registered in the ready queue 119 and is dispatched to the CPU 11 in the order of the priority by the process scheduler 117, the thread transitions to a RUN state. In the RUN state, a thread, to which time slice is allocated, is executed by the CPU 11. When the executed thread spends the time slice, then the thread returns to a READY state by preempt (forced revoke for execution right). A thread in the RUN state may call a predetermined function (system call) by itself even halfway through the time slice duration given and transition to the READY state or the WAIT state.

The WAIT state is a state where a thread waits for a condition necessary to execution. Such a condition includes waiting for a completion notification of I/O processing when an I/O request is made to an input/output device, waiting for input from a keyboard, waiting for a message from another program and the like. When a thread makes an I/O request to the HDD 25, the thread itself calls a function to suspend execution even during the time slice to transition to the WAIT state and remains in the wait queue 121 until an I/O processing completion notification is received. The SUSPEND state is a state where a thread in the RUN state, the READY state, or the WAIT state is forcibly kept in the WAIT state because another thread calls a function. The thread that has transitioned to the SUSPEND state remains in the force-suspend queue 123 until another thread calls a function to resume the thread.

Transition from the RUN state, the READY state, or the WAIT state to the SUSPEND state and transition from the SUSPEND state to the READY state is implemented by using an API function called SuspendThread and ResumeThread in Windows®, respectively. An API function making all threads created by the process targeted for suspend or resume is called, whereby suspend/resume of the process can be implemented. The thread underwent all processing calls a function to terminate by itself in the RUN state and terminates.

Example Shift Procedure from Normal Mode State to Doze Mode

Figure 6:
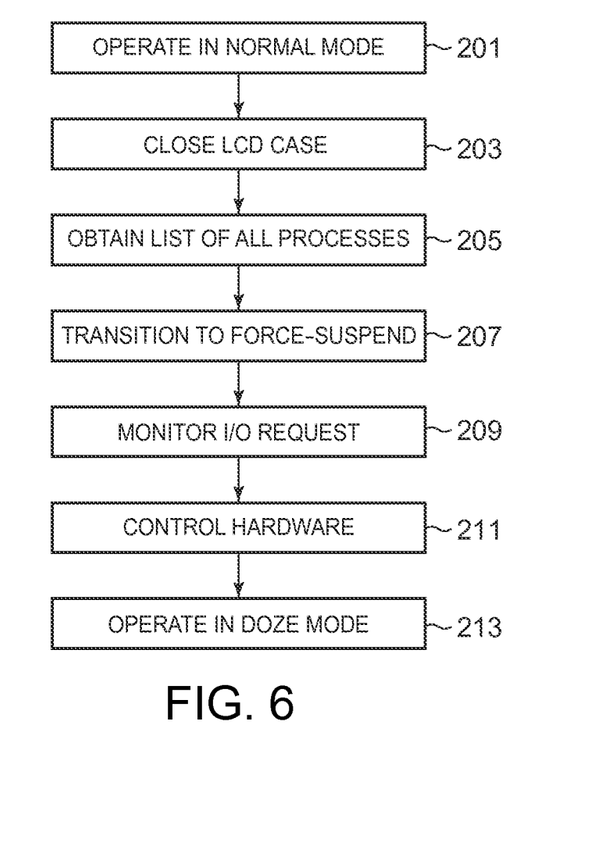
FIG. 6 is a flowchart describing the procedure to shift from the normal mode to the doze mode.

FIG. 6 is a flowchart describing a procedure to shift from the normal mode to the doze mode. At block 201, a user logs in with a predetermined CPU privilege level and the laptop PC 10 operates in the normal mode. In the normal mode, the software illustrated in FIG. 2 is loaded into the main memory 15, and electric power is supplied to the hardware illustrated in FIG. 1. The user selects the chat program 101 as an application implementing a specific function through the interface screen that the doze mode control program 105 provides. A function to maintain network connection by operating the wireless module 29 is always designated as a specific function by default.

At block 203, when the user closes the LCD case before moving from the office to a meeting room, the lid sensor 37 operates so that a shift event is sent to the doze mode control program 105 through the OS 107. When receiving the shift event, at block 205 the doze mode control program 105 calls an API function to obtain names of all of the currently created processes, process IDs and information on their privilege modes from the process list 115 of the process management unit 113. As the API function to obtain the created processes, CreateToolhelp32Snapshot of Windows® may be used, for example.

The process management unit 113 manages the currently created processes in any of the RUN state, the READY state, the WAIT state and the SUSPEND state. At block 207, the doze mode control program 105 extracts processes to be force-suspended from all of the processes, calls API functions for the processes, and makes the processes transition to the SUSPEND state.

Since the execution of the processes that have transitioned to the SUSPEND state are stopped, the utilization of the CPU 11 decreases. Processes created by the chat program 101 are classified into the I/O monitor group, and therefore they are not force-suspended and continue a scheduling state. The OS 107 decreases a set of an operating frequency and an operating voltage of the CPU 11 in accordance with the utilization of the CPU 11 detected by the power supply management unit 112. When it is determined that the CPU 11 is in an idle state or the utilization decreases to a predetermined value or lower, the power supply management unit 112 further makes the CPU 11 transition to a sleeping state or an operating state with less power consumption as the processing speed of the CPU is lowered correspondingly, thus reducing power consumption. Processes of the I/O monitor group that are not force-suspended among all of the processes existing immediately before the shift to the doze mode become a target for scheduling by the scheduler 117, and when a condition is satisfied, these processes are executed.

At block 209, in the case where a process of the I/O monitor group makes an I/O request to the HDD 25, the doze mode control program 105 registers the corresponding I/O request packet in the queue 127 and instructs the device driver 133 so as not to transfer the I/O request packet to the device driver 133. A process in the RUN state making an I/O request immediately transitions to the WAIT state and is registered in the wait queue 121, and waits for an I/O processing completion notification from the device driver 133.

However, since the I/O request packet is registered in the queue 127, the device driver 133 does not return the I/O processing completion notification to the process. Thus, during the doze mode, the process making the I/O request remains in the WAIT state. Instead of registering the I/O request packet in the queue 127, the I/O request packet is once transferred to the device driver 133, and the I/O processing completion notification returned from the device driver 133 may be registered in the queue 127.

Among the processes of the I/O monitor group, a process making an I/O request to the HDD 25 transitions to the WAIT state. Among the processes of the I/O monitor group, a process waiting for a message from a process that has transitioned to the SUSPEND state also transitions to the WAIT state while it waits for the message. Thus, major processes to be scheduled between the RUN state and the WAIT state and executed include a process created by the chat program 101 to implement a specific function, a system process necessary for the execution, and a process to maintain a basic function, for example.

Among system processes, a thread of a process making an I/O request transitions to the WAIT state during the doze mode, whereas a thread not making an I/O request is executed. A system process registered in the wait queue 121 until a message comes from another process is registered in the ready queue 119 upon arrival of the message, and therefore the chat program 101 can be executed with any trouble. Further, the OS 107 can detect a return event created by the lid sensor 37 during the doze mode, and therefore resumption of the normal mode can be conducted from the doze mode without any trouble.

In the doze mode, most processes not making an I/O request to the HDD 25 among the processes of the I/O monitor group do not have a substantial job, and therefore transitions to the WAIT state. Then, the CPU 11 executes a system idle process for a longer time and the utilization thereof decreases, resulting in that the CPU 11 transitions to a sleeping state and power consumption is reduced. Processes of the antiviral program 103, which also are included in the processes of the I/O monitor group, are registered in the wait queue 121 because they make an I/O request to the HDD 25. A process executed in the doze mode may create a new process other than the processes obtained at block 205. However, such a process making an I/O request to the HDD 25 is registered in the wait queue 121, or when the process does not make an I/O request, the execution of the process does not yield extremely large difference in power consumption, thus presenting no problem.

With the procedure before block 209, process control is the doze mode is completed. At block 211, in order to operate minimum devices required to implement the specific function and the basic function in the doze mode, the doze mode control program 105 instructs the EC 35 to stop predetermined devices. This instruction may specify individual devices, or devices to be stopped may be specified and registered in the EC 35 beforehand and the instruction for simply stopping may be sent to the EC 35.

In accordance with the instruction, the EC 35 stops electric power supply to the LCD 19, the HDD 25, the ODD 27 and the radiating fan 39. The EC 35 maintains electric power supply to the CPU 11, the main memory 15, the MCH 13, the GPU 17, the ICH 23, the EC 35, the DC/DC converter 41, and the lid sensor 37. Since the devices receiving electric power consume small power, consumption of the batteries in the battery pack 43 can be decreased. Although the HDD 25 does not have to operate in the doze mode, electric power supply to the HDD 25 is not stopped and instead the power supply management unit 112 may send a command for spin-down to the HDD 25.

At block 213, shift to the doze mode is completed, and the chat program 101 can maintain the session via the wireless module 29. Thus, the other user who has configured the session of the chat program 101 with the laptop PC 10 judges that the user of the laptop PC 10 is ready for immediate response and can send conversation data even during movement. Although the user cannot input data for response through the keyboard of the laptop PC 10 in the doze mode, the user can continuously show to the other user that he/she is ready for immediate answer even during movement, and can return to the normal mode and make a response immediately after movement.

In the doze mode, many processes are registered in the force-suspend queue 123 or in the wait queue 121, and therefore the number of the processes in the scheduling state decreases. Therefore, there is little likelihood that the chat program 101 is swapped out from the main memory 15 to the HDD 25. This can be supported also from the chat program 101 capable of continuing a normal operation immediately before the transition to the doze mode and continuing an operation similar to that before the transition to the doze mode even after the transition without starting a new operation.

Example Shift Procedure from Doze Mode to Normal Mode

Figure 7:
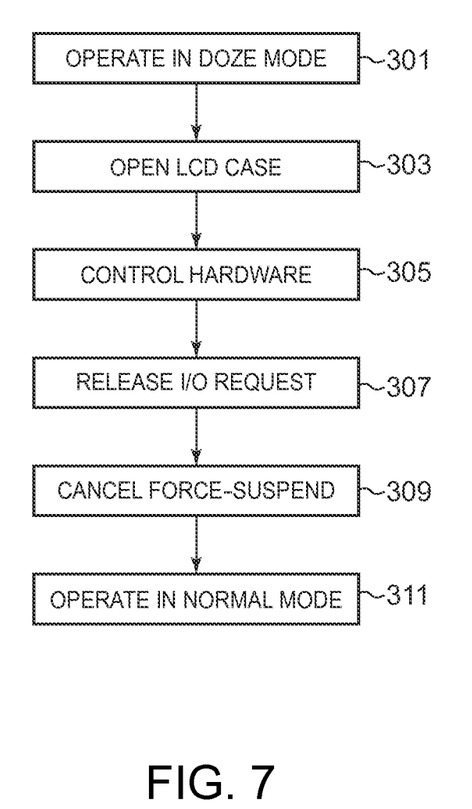
FIG. 7 is a flowchart illustrating the procedure to shift from the doze mode to the normal mode.

The following describes the procedure to resume the normal mode from the doze mode. FIG. 7 is a flowchart illustrating a procedure to resume the normal mode from the doze mode. At block 301, the laptop PC 10 operates in the doze mode, and maintains only a function to make the chat program 101 maintain a session and a function to maintain connection with a wireless network as specific functions as well as a basic function. At block 303, when the user opens the LCD case, the lid sensor 37 creates a return event. The return event is transferred to the doze mode control program 105 via the device driver 129 and the OS 107. At block 305, the doze mode control program 105 instructs the EC 35 to supply electric power to the devices stopped when shifting to the doze mode.

In accordance with the instruction, the EC 35 controls the DC/DC converter 41 to supply electric power to the devices as target and makes a completion notification to the doze mode control program 105. At block 307, the doze mode control program 105 notifies the intermediate driver 125 that resumption of the normal mode is performed. The intermediate driver 125 receiving the notification transfers the I/O request packets registered in the queue 127 to the device driver 133 based on a FIFO algorithm. When the device driver 133 sends the received I/O request packet to the HDD 25, reading/writing processing is performed with respect to the HDD 25.

When the processing by the HDD 25 is completed, the device driver 133 transfers an I/O processing completion notification to the processes making an I/O request registered in the wait queue 121 via the intermediate driver 125. The processes receiving the I/O processing completion notification transition from the WAIT state to the READY state, are registered in the ready queue 119 and wait for dispatch by the scheduler 117. At block 309, the doze mode control program 105 calls an API function for the processes registered in the force-suspend queue 123 for resuming and makes the processes transition to the READY state. When the above-stated procedure is completed, at block 311 the laptop PC 10 resumes the normal mode.

Resumption from the doze mode to the normal mode simply includes release processing from the queue 127 by the intermediate driver 125 and resume processing from the force-suspend queue 123 by the process management unit 113, and therefore such resumption can be completed in a shorter time than resumption from suspend. Thus, the doze mode is easy to use for a user, unlike suspend that the user may hesitate to use because of time required for resumption.

Shift Procedure from Doze Mode to Suspend or Hibernation

Figure 8:
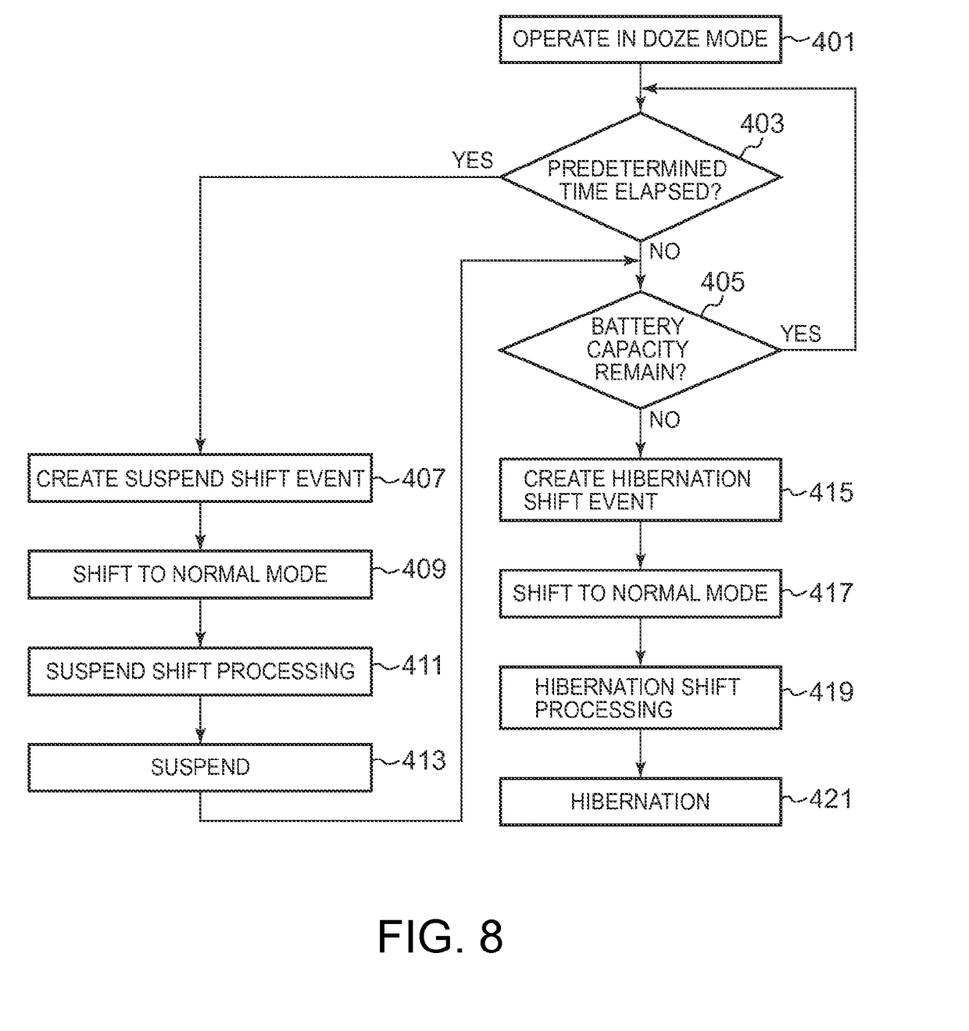
FIG. 8 is a flowchart illustrating the procedure to shift from the doze mode to suspend or hibernation.

The following describes a procedure to shift from the doze mode to suspend or hibernation. FIG. 8 is a flowchart illustrating the procedure to shift from the doze mode to suspend or hibernation. At block 401, in the laptop PC 10 operating in the doze mode, electric power is supplied to the CPU 11 and predetermined devices so as to maintain the specific function and the basic function. The doze mode is not intended to be kept for a long time unlike suspend because the doze mode consumes more power, and therefore it is desirable to make the laptop PC 10 shift from the doze mode to suspend or hibernation based on a predetermined condition so as to reduce consumption of accumulated electricity in the battery pack 43.

At block 403, a timer of the OS 107 determines whether the elapsed time since detecting the shift event reaches a predetermined time or not. The timer of the OS 107 does not make an I/O request to the HDD 25, and therefore the timer is executed also in the doze mode. When the elapsed time reaches the predetermined time, the procedure proceeds to block 407, where the timer creates a suspend shift event. Before shifting to suspend, the power supply management unit 112 has to make an inquiry to the device driver loaded at that time whether electric power supplied to devices can be stopped or not. Thus, before shifting to suspend, resumption to the normal mode is conducted so as to execute programs using the respective devices.

At block 409, in response to the suspend shift event, the laptop PC 10 resumes the normal mode with the procedure from block 305 to block 311 of FIG. 7. At block 411, when the power supply management unit 112 receives a notification to permit the stopping of power supply to devices from all device drivers, the power supply management unit 112 instructs the EC 35 via the system BIOS 135 to stop electric power to the devices one by one to shift to suspend (block 413). Since the shift time from the doze mode to the normal mode is very short, the shift from the doze mode to suspend can be completed with a user hardly being aware of the resumption of the normal mode.

In suspend, electric power is supplied to the main memory 15 and the EC 35, so that the EC 35 regularly monitors the remaining battery capacity of the battery pack 43. At block 415, when the remaining battery capacity runs low, the EC 35 creates a hibernation shift event at block 415. The hibernation shift event is sent to the power supply management unit 112 via the system BIOS 135. When receiving the notification, at block 417 the power supply management unit 112 makes the laptop PC 10 resume the normal mode similarly to block 409, and at block 419 performs hibernation processing to shift to the hibernation (block 421).

Figure 9:
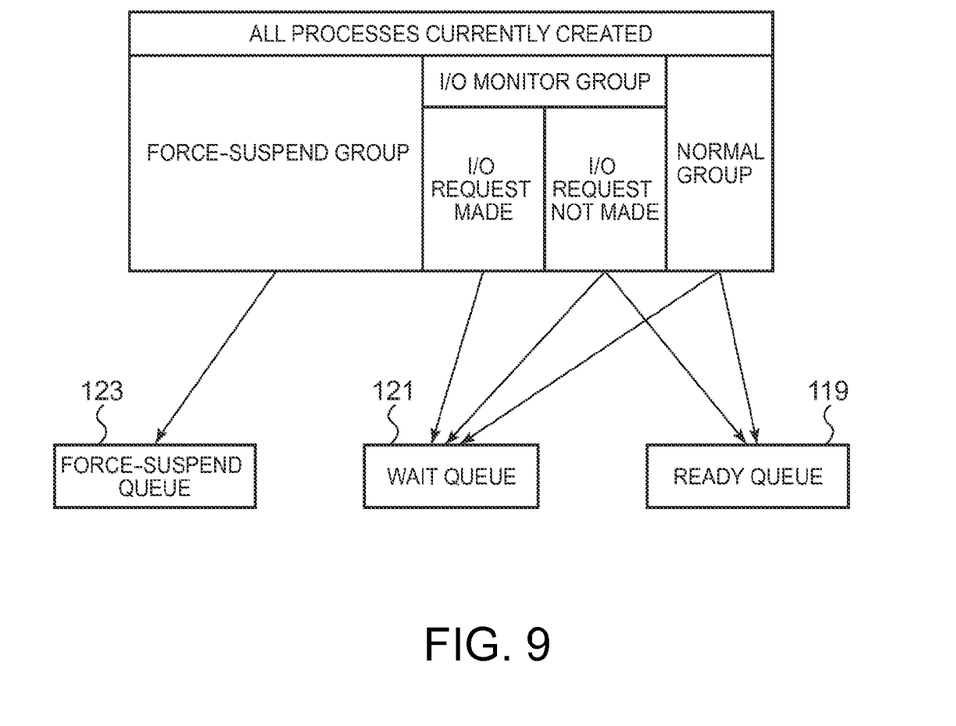
FIG. 9 illustrates another process control method in the doze mode.

The description so references the case where a process implementing a specific function does not make an I/O request to the HDD 25. However, an embodiment does not exclude the case where a process implementing a specific function makes an I/O request to the HDD 25. For instance, it is conceivable that a specific function is implemented by a process that has to make an I/O request to the HDD 25 only for a very short time or only in the initial stage in the doze mode. In this case, another group is provided, in which the force-suspend and the monitoring of the I/O request are not conducted but control is conducted in the same state as in the normal mode, and a process implementing the specific function is classified into the group. At this time, it is desirable that electric power to the HDD 25 is not stopped in the doze mode and the power supply management unit 112 makes the HDD 25 spin down depending on the access state.

FIG. 9 illustrates a method to control processes in that case. All processes are classified into three groups of the force-suspend group, the I/O monitor group, and the normal group not subjected to special process control, and a process implementing the specific function is classified into the normal group. The control method for the processes of the force-suspend group and the I/O monitor group in the doze mode is the same as in the case of FIG. 4.

The convenience of the doze mode has been described so far by way of the example of maintaining a session of a chat program and connection with a wireless network as specific functions. However, the doze mode has a feature that the suspend currently existing as a power-saving mode does not have. For resumption from suspend, the OS after the resumption has to notify the application loaded and the device drivers of the resumption. Thus, although resumption can be quickly conducted from suspend at first when the OS is introduced, when the number of applications and device drivers installed increases, the time for resumption may be lengthened. On the other hand, in the doze mode, simply controlling the process enables shift to the normal mode, and therefore the time for resumption is not lengthened even when the number of applications and device drivers installed increases, and the resumption can be conducted in a short time.

For resumption from suspend, the laptop PC 10 cannot be returned completely to the original operating environment in some cases. For instance, the mouse may not operate correctly or reconnection cannot be established with a wireless network after resumption. One of the reasons therefor resides in that a test of resumption is conducted for the overall system during preloading, but when a device driver is updated later or installed newly, a test of resumption cannot be conducted with respect to the overall system. On the other hand, since individual control conducted in the doze mode is the same as in the normal mode, and there is no need to notify the device driver of the resumption, the laptop PC 10 can be returned surely to the operating environment immediately before, thus improving the convenience as the operating mode during transfer for a short time.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth example embodiments and, although specific terms are used, the description thus given uses terminology in a generic and descriptive sense only and not for purposes of limitation.

An embodiment is not limited to the embodiments illustrated in the drawings, and can use any known configuration as long as the advantages of an embodiment can be obtained therefrom.

What is claimed is:

1. A computer program product comprising:
    a non-transitory computer readable storage medium having computer readable program code embodied therewith that shifts a computing device operating in a normal mode to a doze mode without interrupting a specific function, the computer readable program code comprising:
    computer readable program code configured to detect a shift event that makes the computing device shift from the normal mode to the doze mode;
    computer readable program code configured to, in response to the shift event, suspend a process that is not necessary to implement the specific function;
    computer readable program code configured to perform, in response to the shift event, suspension, during the doze mode, of an I/O processing with respect to a process that makes an I/O request to a disk drive among processes not subjected to suspension);
    computer readable program code configured to detect a suspend event created when a predetermined time has elapsed since the shift event is detected;
    computer readable program code configured to resume the suspended process in response to the suspend event;
    computer readable program code configured to cancel suspension of an I/O request in response to the suspend event; and
    computer readable program code configured to suspend the computing device responsive to completion of resuming and canceling.

2. The computer program product according to claim 1, wherein the process that makes an I/O request to a disk drive comprises a process created by a program that takes countermeasures against force-suspending.

3. The computer program product according to claim 1, wherein a process implementing the specific function does not make an I/O request to the disk drive at least during the doze mode.

4. The computer program product according to claim 3, wherein the computing device includes a wireless module installed thereon, and a process implementing the specific function comprises a process that maintains connection between the wireless module and an access point during the doze mode.

5. The computer program product according to claim 4, wherein a process implementing the specific function comprises a process that maintains a session formed by a chat program.

6. The computer program product according to claim 5, wherein a process implementing the specific function comprises a process that executes processing to make the computing device resume the normal mode from the doze mode.

7. The computer program product according to claim 6, wherein a process implementing the specific function comprises a process that executes processing to make the computing device shift to one of suspend and hibernation from the doze mode.

8. The computer program product according to claim 1, wherein a process implementing the specific function regularly refers to a page allocated to the process in a virtual memory so as to prevent a page being swapped out from a physical memory to a disk drive.

9. The computer program product according to claim 1, further comprising:
    computer readable program code configured to perform, in response to the shift event, forced suspension of a process that is not necessary to implement the specific function, the process being selected from processes existing when the shift event is detected.

10. The computer program product according to claim 9, wherein the force-suspended process comprises a process created by a task scheduler registering an execution time of a predetermined program.

11. The computer program product according to claim 1, further comprising:
    computer readable program code configured to stop electric power supplied to a disk drive in response to the shift event.

12. The computer program product according to claim 1, further comprising:
    computer readable program code configured to stop electric power supplied to a radiating fan that releases heat inside a case in response to the shift event.

13. The computer program product according to claim 1, wherein the computing device operates with less power consumption in the doze mode as compared to the normal mode while executing a process to implement the specific function.

14. An apparatus comprising:
    one or more processors;
    a disk drive;
    a wireless module;
    an event detection unit that detects a shift event that shifts the apparatus operating in a normal mode to a doze mode without interrupting a specific function;
    a request control unit that, in response to the shift event, suspends, during the doze mode, an I/O processing with respect to an I/O request made to the disk drive by a predetermined process selected from processes existing, when the shift event is detected; and a force-suspend unit that, in response to the shift event, suspends a predetermined process selected from processes existing when the shift event is detected;

wherein the event detection unit detects a return event that resumes the normal mode from the doze mode;

wherein, in response to the return event, the force-suspend unit resumes the suspended process; and further wherein the request control unit releases the suspended I/O processing completion notification.

15. The apparatus according to claim 14, further comprising a chat program that makes the apparatus implement a function to maintain a session formed through a wireless network without making an I/O request to the disk drive.

16. The apparatus according to claim 14, wherein the apparatus operates with less power consumption in the doze mode as compared to the normal mode while executing a process to implement the specific function.

17. A method comprising:

detecting a shift event that makes a computing device shift from the normal mode to a doze mode;

in response to the shift event, suspending, during the doze mode, an I/O processing with respect to a process that makes an I/O request to a disk drive among processes not subjected to the suspending;

detecting a suspend event created when a predetermined time has elapsed since the shift event is detected;

resuming the suspended process in response to the suspend event;

cancelling suspension of an I/O request in response to the suspend event; and suspending the computing device responsive to completion of the resuming and the canceling.

18. The method according to claim 17, further comprising:

detecting a return event that resumes the normal mode;

in response to the return event, making a process whose execution is stopped transition to a ready state; and in response to the return event, releasing a suspended I/O request.

* * * * *